(12) United States Patent
Higuchi

(10) Patent No.: US 11,250,274 B2
(45) Date of Patent: Feb. 15, 2022

(54) IN-VEHICLE DEVICE AND CONTROL METHOD

(71) Applicant: TOYOTA JIDOSHA KABUSHIKI KAISHA, Toyota (JP)

(72) Inventor: Takamasa Higuchi, San Jose, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 16/448,221

(22) Filed: Jun. 21, 2019

(65) Prior Publication Data

US 2020/0005050 A1 Jan. 2, 2020

(30) Foreign Application Priority Data

Jun. 27, 2018 (JP) .............................. JP2018-121831

(51) Int. Cl.
*G06K 9/00* (2006.01)
*H04N 7/18* (2006.01)

(52) U.S. Cl.
CPC ......... *G06K 9/00791* (2013.01); *H04N 7/183* (2013.01); *G06K 2209/15* (2013.01)

(58) Field of Classification Search
CPC ........... G06K 9/00791; G06K 2209/15; G06K 9/6262; H04N 7/183; H04N 7/18; G08G 1/0175; G08G 1/0965
USPC ....................................................... 382/105
See application file for complete search history.

(56) References Cited

U.S. PATENT DOCUMENTS

| 6,754,369 B1* | 6/2004 | Sazawa ................ G06K 9/3266 382/105 |
| 9,405,988 B2* | 8/2016 | Alves .................... G06K 9/3258 |
| 2012/0019655 A1* | 1/2012 | Fukamachi ............. G06T 7/215 348/142 |
| 2013/0182110 A1* | 7/2013 | Tziperman ............. G07B 15/02 348/148 |
| 2019/0272437 A1* | 9/2019 | Wang ....................... G06K 9/72 |

FOREIGN PATENT DOCUMENTS

| JP | 2002-260165 A | 9/2002 |
| JP | 2010-249641 A | 11/2010 |
| JP | 2011-086000 A | 4/2011 |
| JP | 2011-100409 A | 5/2011 |
| JP | 2014-182248 A | 9/2014 |
| JP | 2017-211760 A | 11/2017 |

* cited by examiner

*Primary Examiner* — Van D Huynh
(74) *Attorney, Agent, or Firm* — Oliff PLC

(57) ABSTRACT

An in-vehicle device comprises an image recognizer configured to acquire an image using a camera for photographing the exterior of a vehicle and execute processing for recognizing license plate information included in the image at intervals of a predetermined period; and a period determiner configured to determine the period to perform the recognition processing on the basis of a length of time in which a license plate of another vehicle stays within a field of view of the camera.

7 Claims, 10 Drawing Sheets

IN-VEHICLE DEVICE AND CONTROL METHOD

CROSS REFERENCE TO THE RELATED APPLICATION

This application claims the priority of Japanese Patent Application No. 2018-121831, filed on Jun. 27, 2018, which is hereby incorporated by reference herein in its entirety.

BACKGROUND

Technical Field

The present disclosure relates to an in-vehicle device for recognizing license plate information of a vehicle.

Description of the Related Art

License plate information can be used to search for a vehicle. As described in Japanese Patent Application Publication No. 2011-100409, alphanumerical character information on a license plate of a vehicle can be recognized from an image captured by an in-vehicle camera.

SUMMARY

When the license plate information of a vehicle is recognized by a camera installed in another vehicle, allocation of the resources in the in-vehicle device becomes a problem.

The in-vehicle device typically executes processing other than recognition of the license plate information, such as communicating with other vehicles or a roadside device and providing a user with information, and therefore the in-vehicle device must allocate resources such as a processor and a memory that are built into the device appropriately to the license plate recognition processing and the other processing.

The present disclosure has been designed in consideration of the problem described above, and an object thereof is to allocate hardware resources appropriately in an in-vehicle device that recognizes a license plate on the basis of an image of a vehicle exterior.

The present disclosure in its one aspect provides an in-vehicle device comprising an image recognizer configured to acquire an image using a camera for photographing the exterior of a vehicle and execute processing for recognizing license plate information included in the image at intervals of a predetermined period; and a period determiner configured to determine the period to perform the recognition processing on the basis of a length of time in which a license plate of another vehicle stays within a field of view of the camera.

The present disclosure in its another aspect provides an in-vehicle device comprising an image recognizer configured to acquire an image using a camera for photographing the exterior of a vehicle and executing processing for recognizing license plate information included in the image at intervals of a predetermined period; an information acquirer configured to acquire environment information, which is information relating to a road environment on the periphery of the vehicle; and a period determiner configured to determine the period to perform the recognition processing on the basis of the road environment.

The present disclosure in its another aspect provides an in-vehicle device comprising a first processor configured to acquire an image using a camera for photographing the exterior of a vehicle and executing processing for recognizing license plate information included in the image; a second processor configured to execute processing other than recognition of the license plate information; and an allocator configured to determine an amount of resources to be allocated to the first processor and an amount of resources to be allocated to the second processor on the basis of a length of time in which a license plate of another vehicle stays within a field of view of the camera.

The present disclosure in its another aspect provides a control method for causing an in-vehicle device installed in a vehicle to execute an image recognition step for acquiring an image using a camera for photographing the exterior of the vehicle and executing processing for recognizing license plate information included in the image at intervals of a predetermined period; and a period determination step for determining the period to perform the recognition processing on the basis of a length of time in which a license plate of another vehicle stays within a field of view of the camera.

Another aspect of the present disclosure is a program for causing a computer to execute the control method described above or a computer-readable storage medium for storing the program non-temporarily.

According to the present disclosure, hardware resources can be allocated appropriately in an in-vehicle device that recognizes a license plate on the basis of an image of a vehicle exterior.

DESCRIPTION OF THE EMBODIMENTS

Figure 1:
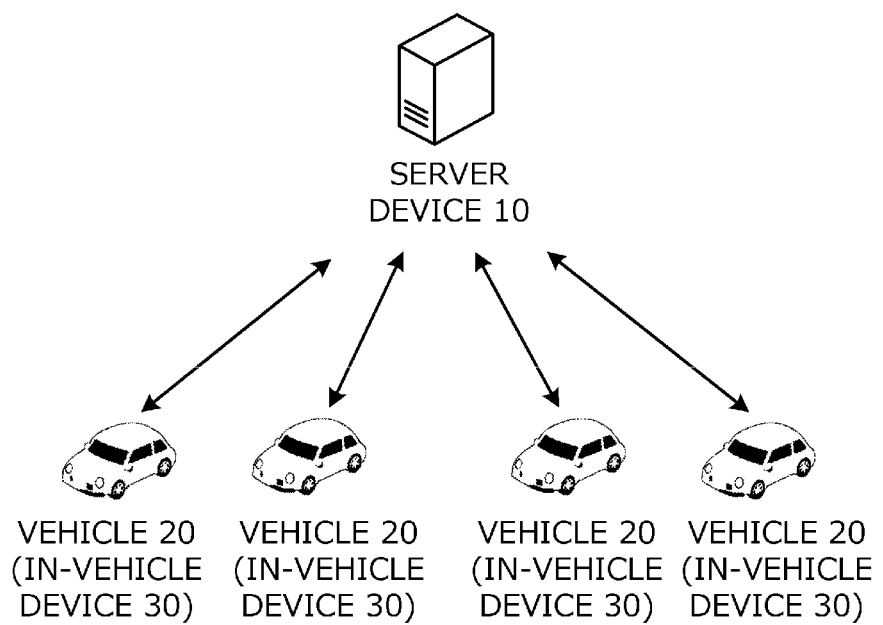
FIG. 1 is a schematic view of a vehicle search system according to the present disclosure.

An in-vehicle device according to the present disclosure acquires images using a camera for photographing the exterior of the vehicle and executes processing for recognizing license plate information included in the images at intervals of a predetermined period. The license plate information can be recognized using a known method.

A problem that arises in this device is the degree to which the resources of the in-vehicle device are allocated to recognition of the license plate information. For example, if license plate information recognition is implemented in a short period in a situation where no other vehicles are moving within the field of view of the camera, the resources of the in-vehicle device are consumed wastefully. In a situation where the speeds of oncoming vehicles are high, on the other hand, the period of the recognition processing must be shortened to ensure that no information is missed.

Therefore, the in-vehicle device according to the present disclosure determines a period (referred to hereafter as a recognition period) while executing processing for recognizing license plate information on the basis of the length of time in which the license plate of another vehicle stays within the field of view of the camera.

Note that the staying time of the license plate of the other vehicle may also be a representative value of a plurality of vehicles.

When the time in which the license plate of the other vehicle stays within the field of view of the camera is short, the recognition period is set to be short in order to increase the number of opportunities for recognizing the information. When the time in which the license plate of the other vehicle stays within the field of view of the camera is long, on the other hand, the recognition period is set to be long in order to free up resources.

Hence, when the time in which the license plate of the other vehicle stays within the field of view of the camera is short, the recognition period may be shortened.

According to this aspect, the resources of the in-vehicle device can be allocated appropriately.

Note that the length of time in which the license plate of the other vehicle stays within the field of view of the camera may be based on actual measurement or estimation. Further, the staying time does not necessarily have to be calculated as a value. For example, the recognition period may be calculated directly on the basis of a result acquired by sensing another element that affects the staying time.

Further, the period determiner may acquire a value relating to the time in which the license plate of the other vehicle stays within the field of view of the camera by analyzing a plurality of images acquired per unit time, and may determine the period on the basis of the acquired value.

The value relating to the staying time of the license plate may be the staying time of the license plate itself or a value that indirectly represents the staying time of the license plate. For example, the value may be speed information (an absolute speed or a relative speed) relating to the other vehicle or a value indicating the manner in which a set of license plate information included in the image moves through a vector space. Further, a plurality of values relating to the staying time of the license plate may be acquired, and a representative value (an average value, a median value, a mode value, a maximum value, a minimum value, or the like, for example) may be used.

Further, the in-vehicle device may further comprise an information acquirer configured to acquire environment information, which is information relating to a road environment on the periphery of the vehicle, and the period determiner may estimate the time in which the license plate of the other vehicle stays within the field of view of the camera on the basis of the environment information.

Thus, the staying time of the license plate of the other vehicle may be estimated on the basis of the road environment. For example, when the road environment of the vehicle installed with the in-vehicle device is estimated to be an environment in which "other vehicles pass through the field of view of the camera at high speed", the recognition period may be set to be short, and when the road environment of the vehicle is estimated to be an environment in which "the movement speeds of other vehicles are low", the recognition period may be set to be long.

Further, the environment information may be acquired on the basis of a result of comparison between a current position of the vehicle and a road database. Further, the environment information may be acquired from a roadside device.

Further, the environment information may be at least one of information relating to a number of lanes, information relating to a road width, and information relating to a relative position relative to an intersection.

The reason for this is that the movement speeds of oncoming vehicles appearing on the images vary according to the number of lanes and the road width. Moreover, from the relative position relative to an intersection, it is possible to estimate whether the vehicle is positioned at the front of a line of vehicles or in the middle of a line of vehicles. In other words, it is possible to estimate whether or not the vehicle is in a position where the license plates of a larger number of vehicles can be captured.

Further, the in-vehicle device may further comprises a speed acquirer configured to acquire a relative speed relative to the other vehicle, and the period determiner may determine the period also on the basis of the relative speed relative to the other vehicle.

The speed of the host vehicle can be acquired from the output of a vehicle speed sensor, a host vehicle speed acquired by a GPS receiver, vehicle speed information transmitted by CAN message, and so on. The speed of the other vehicle, meanwhile, can be calculated using vehicle speed information transmitted wirelessly from the other vehicle, image analysis, and so on.

Specific embodiments of the present disclosure will be described below on the basis of the figures. Unless specifically indicated otherwise, the technical scope of the disclosure is not limited to the hardware configurations, module configurations, functional configurations, and so on described in the respective embodiments.

First Embodiment

An outline of a vehicle search system according to a first embodiment will now be described with reference to FIG. 1. The vehicle search system according to this embodiment is constituted by a server device 10 and in-vehicle devices 30 installed in each of a plurality of vehicles 20. The server device 10 is a device for managing the plurality of vehicles 20 under its control. The in-vehicle device 30 is an in-vehicle terminal that is capable of communicating with the server device 10 and executing functions to be described below. Note that FIG. 1 shows the server device 10 singly, but the server device 10 may be provided in a plurality. For example, a plurality of server devices 10 managing different regions may exist.

The in-vehicle device 30 according to this embodiment has functions for acquiring images of the vehicle exterior using a camera installed in the vehicle 20 and recognizing the license plate information of a vehicle (referred to hereafter as the other vehicle) existing on the periphery of the vehicle 20. The recognized license plate information is encrypted and then transmitted to and stored in the server device 10 together with information indicating the position of the vehicle 20. As a result, the server device 10 can ascertain the approximate position of the vehicle having the recognized license plate information.

When searching for a specific vehicle, the server device 10 specifies an area in which the vehicle serving as the subject of the search (referred to hereafter as the search subject vehicle) has been found in the past by referring to the stored information, and then transmits a command (referred to hereafter as a search command) to search for the vehicle to the vehicles 20 that are traveling in the vicinity of the specified area. The in-vehicle device 30, having received the search command, continues to recognize license plate information, and upon finding the search subject vehicle, notifies the server device 10 thereof.

The in-vehicle device 30 executes various processing other than processing for recognizing license plate information. Therefore, the in-vehicle device 30 must appropriately allocate resources used to recognize license plate information and resources used for other processing. For example, when the period (recognition period) to recognize license plate information is shortened, the recognition precision improves, but the other processing may slow down. Conversely, when the recognition period is lengthened, license plate information may be missed.

Figure 2A:
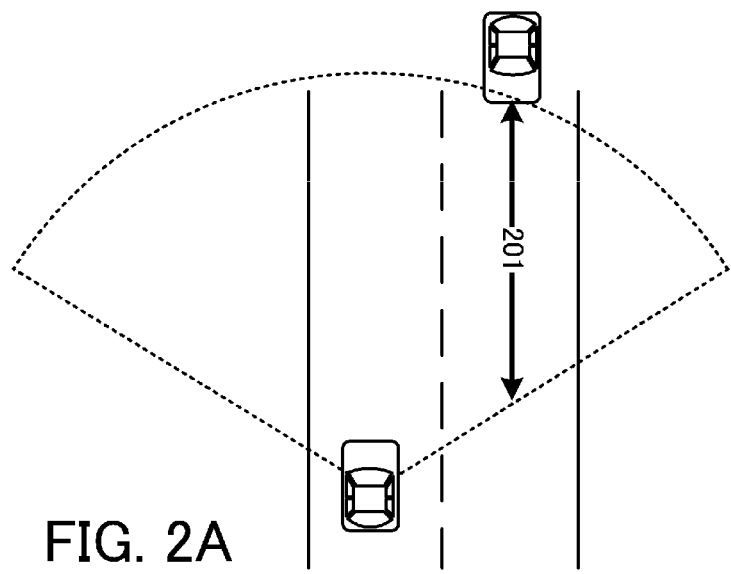
FIGS. 2A to 2C are views showing examples of positional relationships between a vehicle 20 and another vehicle.
Figure 2B:
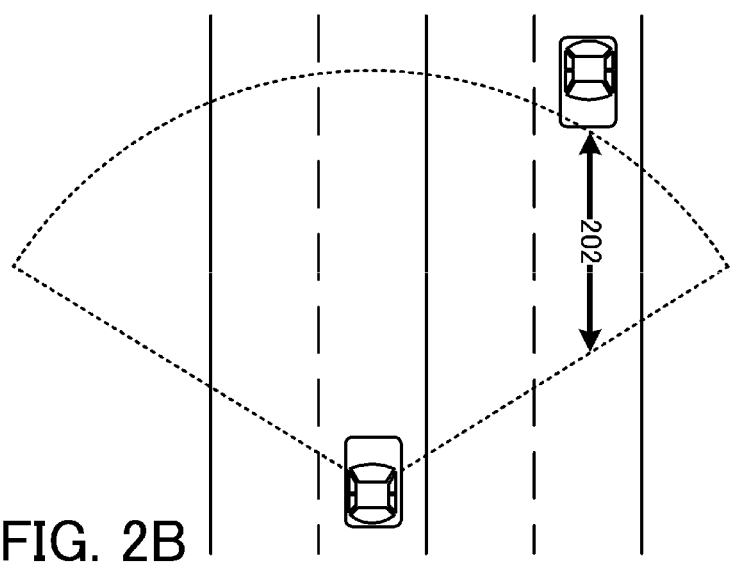
Figure 2C:
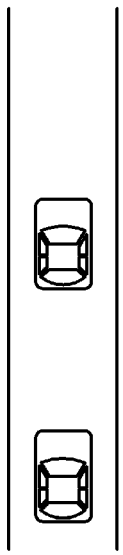

FIGS. 2A to 2C are views showing examples of positional relationships between the vehicle 20 and the other vehicle. Dotted lines indicate an effective field of view (a range in which license plate information can be recognized effectively) of an in-vehicle camera installed in the vehicle 20. In this specification, the field of view of the in-vehicle camera refers to the effective field of view. Further, a frame rate indicates the number of times license plate information is recognized per second. The frame rate is the inverse of the recognition period.

For example, to capture the license plate of a vehicle traveling on an opposing lane on a road shown in FIG. 2A, the recognition processing is preferably performed at a frame rate at which license plate information recognition can be performed at least once within a zone indicated by a reference symbol 201.

Next, a case of travel along a road shown in FIG. 2B will be considered. In this example, the road is wide, and therefore vehicles may pass through a corner of the field of view of the in-vehicle camera. In other words, oncoming vehicles disappear from the image more quickly, and therefore the frame rate is preferably increased in comparison with the case shown in FIG. 2A. For example, the recognition processing is preferably performed at a frame rate at which license plate information recognition can be performed at least once within a zone indicated by a reference symbol 202.

Meanwhile, when traveling on a one-way road such as that shown in FIG. 2C, no oncoming vehicles exist, meaning there is no need to shorten the period of license plate information recognition. In this case, the frame rate is preferably set to be low so that resources can be allocated to other processing.

In the vehicle search system according to the first embodiment, the in-vehicle device 30 solves this problem by determining the recognition period (and the frame rate) dynamically on the basis of the time in which the license plate of the other vehicle stays within the field of view of the in-vehicle camera.

The in-vehicle device 30 according to the first embodiment is a computer having a processor such as a CPU or a GPU, a main storage device such as a RAM or a ROM, and an auxiliary storage device such as an EPROM, a hard disk drive, or a removable medium. The auxiliary storage device stores an operating system (OS), various programs, various tables, and so on, and by loading a program stored therein to a working area of the main storage device and executing the program so that respective constituent units and the like are controlled through execution of the program, functions corresponding respectively to predetermined aims, such as those to be described below, can be realized. Note, however, that all or some of the functions may be realized by hardware circuits such as ASICs and FPGAs.

Figure 3:
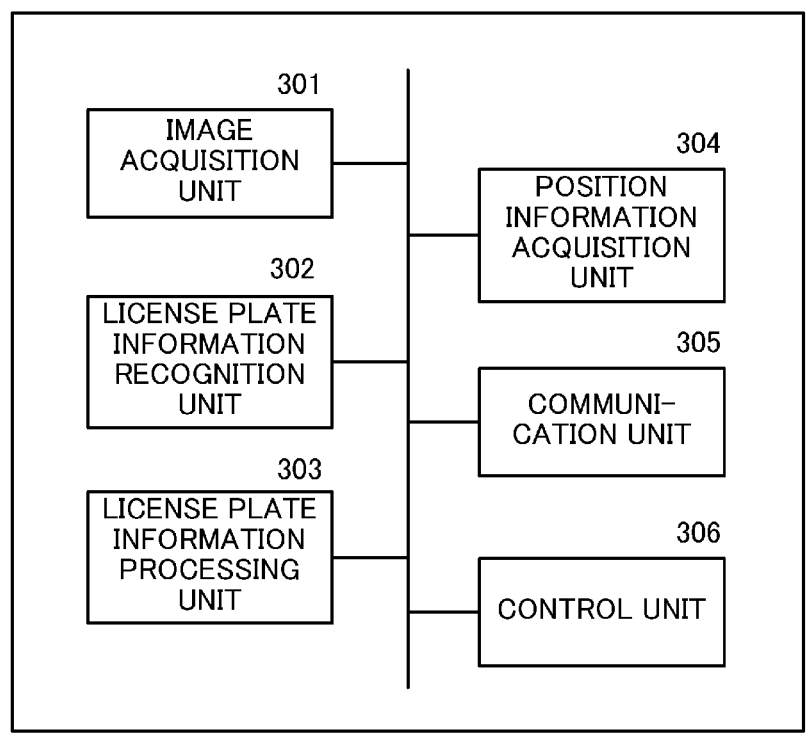
FIG. 3 is a view showing a module configuration of an in-vehicle device 30 according to a first embodiment.

FIG. 3 is a view showing a module configuration of the in-vehicle device 30 according to the first embodiment.

The in-vehicle device 30 according to the first embodiment is configured to include an image acquisition unit 301, a license plate information recognition unit 302, a license plate information processing unit 303, a position information acquisition unit 304, a communication unit 305, and a control unit 306.

The image acquisition unit 301 serves as a unit for acquiring images of the periphery of the vehicle using an in-vehicle camera that is disposed so as to oriented toward the exterior of the vehicle. The in-vehicle camera may be a front camera, a back camera, a side camera, or the like, for example, but is preferably disposed in a position where there are many opportunities for directly facing the license plates of other vehicles.

The license plate information recognition unit 302 serves as a unit (the image recognizer and the first processor) for determining whether or not a license plate of a vehicle exists in an image acquired by the image acquisition unit 301 and recognizing alphanumerical character information (license plate information) included in the license plate. Processing for recognizing the alphanumerical character information of the license plate can be executed using any known method (algorithm).

The license plate information processing unit 303 serves as a unit for encoding the license plate information recognized by the license plate information recognition unit 302 and converting (encrypting) the encoded information into a suitable format for transmission to the outside. In this embodiment, the license plate information processing unit 303 converts all of the detected license plate information into a bit string (referred to as a digest) of a fixed length (m bits). A specific method will be described below.

The position information acquisition unit 304 serves as a unit for acquiring the current position of the vehicle and is typically configured to include a GPS receiver or the like. The information acquired by the position information acquisition unit 304 is transmitted to the control unit 306.

The communication unit 305 is a communication interface for connecting the in-vehicle device 30 to a network. The communication unit 305 is configured to include a wireless communication circuit used for wireless communication, for example. The communication standard used by the communication unit 305 may be a standard employing a mobile communications network, such as 3G or LTE.

The control unit 306 serves as a unit (the period determiner) for controlling the in-vehicle device 30. By controlling execution of the respective modules described above, the control unit 306 executes image acquisition, license plate information recognition, license plate information encoding, digest transmission, and so on. Further, by adjusting the period in which the license plate information is recognized, the control unit 306 allocates the resources used for the license plate information recognition processing and other processing. A specific method will be described below. Note that the control unit 306 may execute processing other than processing relating to license plate information recognition.

Next, a specific method for determining the recognition period (the frame rate) will be described.

Figure 4:
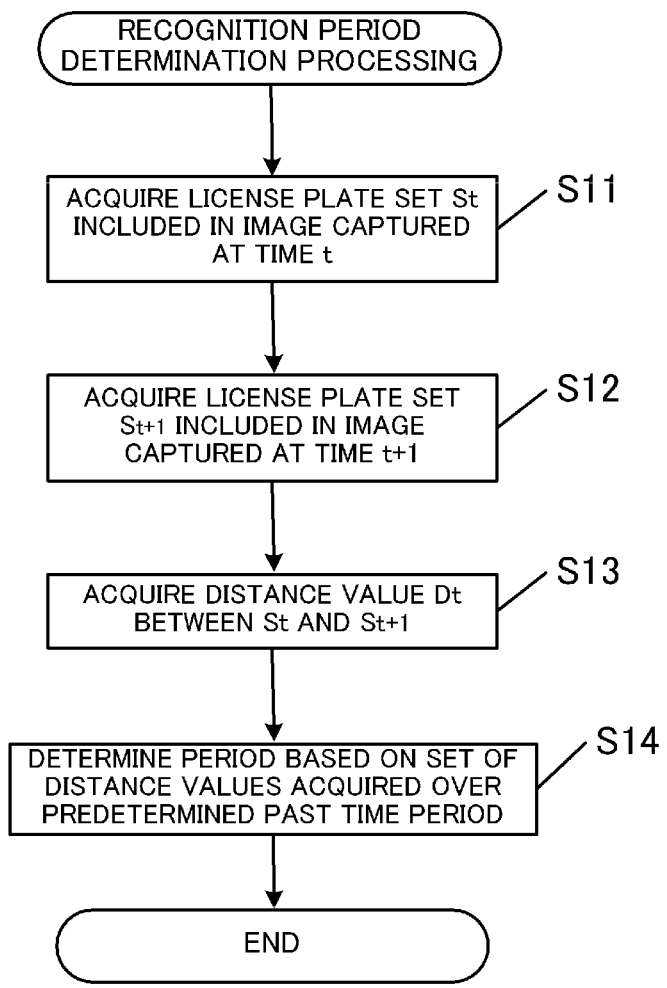
FIG. 4 is a flowchart showing processing executed by the in-vehicle device 30 to determine a recognition period.
Figure 5:
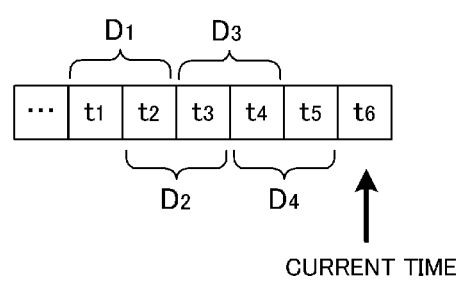
FIG. 5 is a view showing a time series of images acquired at recognition period intervals.

In this embodiment, the in-vehicle device 30 acquires an image periodically from the in-vehicle camera and determines the recognition period on the basis of a plurality of acquired images. FIG. 4 is a flowchart showing processing executed by the in-vehicle device 30 to determine the recognition period. Note that here, the in-vehicle device 30 (the image acquisition unit 301) is assumed to acquire images periodically in accordance with a predetermined period and store the acquired images in an inbuilt memory. FIG. 5 shows a time series of images acquired at intervals of the recognition period. Note that here, to simplify the description, the period at which the image acquisition unit 301 acquires images is assumed to be identical to the recognition period. In other words, when the recognition period is 33.3 milliseconds, images are acquired at a frame rate of 30 images per second. Needless to mention, the period in which the image acquisition unit 301 acquires images and stores the acquired images in the memory may differ from the recognition period.

First, in step S11, an image captured at a time t is acquired and all of the license plate information included in the image is recognized. The time t may be the current time or a time in the past (for example, a time occurring a predetermined number of steps prior to the current time). The set of license plate information recognized on this occasion is set as St.

Next, in step S12, an image captured at a time t+1 is acquired and all of the license plate information included in the image is recognized. The time t+1 is a time occurring one step after the time t. The set of license plate information recognized on this occasion is set as St+1.

Next, in step S13, a value (referred to hereafter as a distance value) Dt representing the distance between the set St and the set St+1 is calculated. The distance value can be calculated using the following formula, for example (the backslash represents a set difference operation).

$$D_t = |S_t \backslash S_{t+1}| + |S_{t+1} \backslash S_t| \quad [\text{Math. 1}]$$

An increase in the distance value Dt corresponds to an increase in the divergence between the set of license plate information included in the image at the time t and the set of license plate information included in the image at the time t+1. In other words, the larger the distance value Dt, the higher the vehicle turnover over a unit time.

Note that in this embodiment, in order to average the results, a plurality of distance values Dt are calculated while modifying t, whereupon the recognition period is determined on the basis of the plurality of calculated distance values (step S14). For example, as shown in FIG. 5, four distance values ($D_1$ to $D_4$) may be calculated, whereupon the average value, the median value, the maximum value, or another value thereof may be determined and used. Note that in the example shown in the figure, images of five past frames are used, but a longer time period may be employed. For example, one image may be acquired per second, a plurality of (29, for example) distance values may be calculated using images acquired over the past 30 seconds, and the average value or the like thereof may be calculated.

Figure 6:
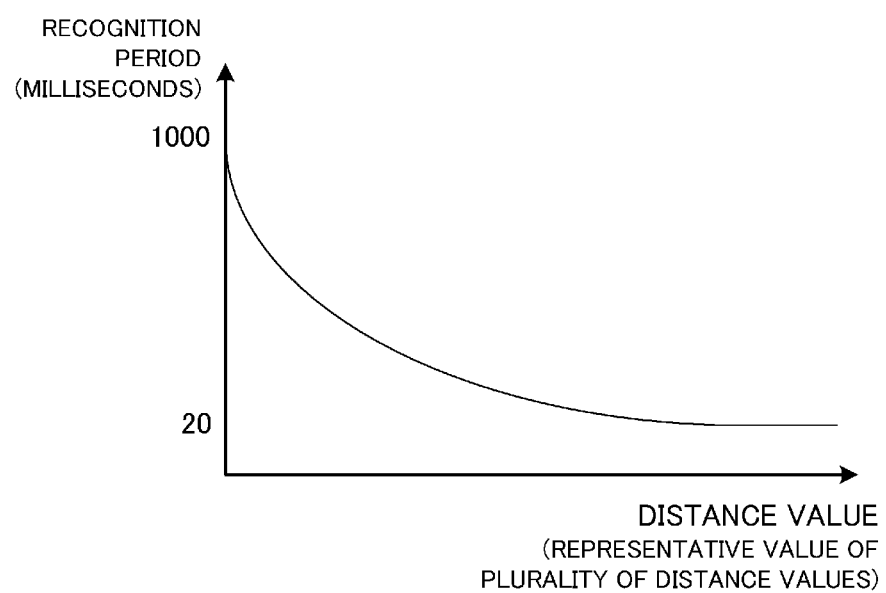
FIG. 6 is a view showing a relationship between the recognition period and a distance value.

The acquired distance value may be said to indirectly represent the time in which the license plate of another vehicle stays within the field of view of the in-vehicle camera. When the value is high, this means that the vehicle turnover over a unit time is also high, and therefore the recognition period is set to be shorter. Associations may be formed between the recognition period and the distance value using a table or the like or using a formula or the like. For example, a correspondence relationship such as that shown in FIG. 6 may be stored in advance and used to set the recognition period.

Note that the processing shown in FIG. 4 is an example, and as long as the amount of temporal variation in the plurality of license plate information included in the images can be determined, a method other than that shown in the figures may be employed. For example, the time each license plate stays within the field of view of the in-vehicle camera may be calculated by tracking a license plate recognized on an image through each frame, and the recognition period may be set on the basis of a representative value thereof.

Next, processing for recognizing the license plate information of a peripheral vehicle using the determined recognition period, generating a digest, and transmitting the generated digest to the server device 10 will be described.

The processing executed by the in-vehicle device 30 is divided into a phase (a gathering phase) for gathering the license plate information and a phase (a search phase) for searching for a specific search subject vehicle on the basis of a search command received from the server device 10.

Figure 7:
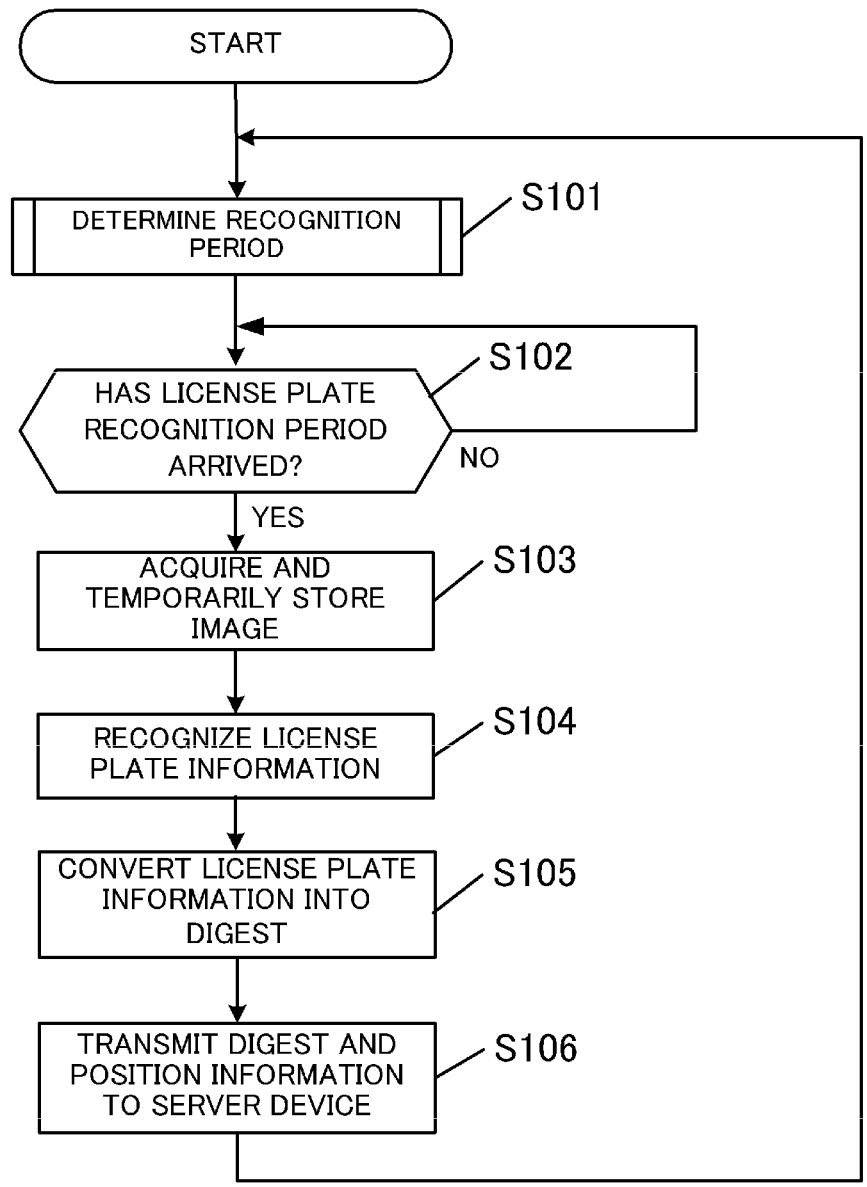
FIG. 7 is a flowchart showing processing executed by the in-vehicle device 30 during a gathering phase.

FIG. 7 is a flowchart showing processing executed by the in-vehicle device 30 (the control unit 306) during the gathering phase. The in-vehicle device 30 executes the gathering phase in a state where a search command has not been received.

First, in step S101, the recognition period is determined on the basis of a plurality of images acquired in the past, as described above. Note that when no images have been acquired, a default value may be set as the recognition period.

Next, in step S102, a determination is made as to whether or not the recognition period has arrived. Here, when the recognition period has not arrived, the arrival of the next recognition period is awaited. Note that while waiting, other processing (processing not related to license plate recognition) may be executed.

When the recognition period arrives, an image is acquired in step S103 via the image acquisition unit 301. The acquired image is stored in the memory temporarily for a predetermined time period. The image stored on this occasion is deleted at a timing when the image is no longer used.

Next, in step S104, the license plate information included in the image is recognized by the license plate information recognition unit 302. For example, a region in which the license plate exists is cut out by means of template matching, and processing for recognizing alphanumerical character information is performed using the cut-out region as a subject. In this step, the license plate information may be recognized using a known method.

In step S105, the license plate information acquired as a recognition result is converted into a digest by the license plate information processing unit 303. More specifically, k hash functions $h_1$ to $h_k$ are applied respectively to the license plate information (set as x) in order to calculate k hash functions $h_1(x)$ to $h_k(x)$. The hash functions $h_1$ to $h_k$ are functions for converting arbitrary license plate information into integers from 0 to m−1.

By executing this processing, the license plate information can be encrypted, enabling an improvement in confidentiality. Note that the hash functions are stored in the license plate information processing unit 303, and shared hash functions are used by all of the vehicles 30 and the server device 10. Thus, it is possible to verify that a subject digest corresponds to the license plate information of the search subject vehicle.

In this example, a digest is generated from a single set of license plate information, but a plurality of sets of license plate information may be superimposed in the digest. For example, a plurality of digests may be synthesized using a bloom filter. Likewise with this configuration, it is possible to verify that the subject digest includes the license plate information of the search subject vehicle.

The digest generated in step S105 is transmitted to the server device 10 via the communication unit 305 together with the information indicating the position of the vehicle 20, acquired by the position information acquisition unit 304 (step S106).

The digest transmitted to the server device 10 is used to search for a vehicle. For example, when a system manager inputs an instruction to conduct a search for a specific vehicle by specifying license plate information, the server device 10 identifies the digest including the specified license plate information by referring to a plurality of digests gathered from the plurality of in-vehicle devices 30. This processing can be performed by converting the specified license plate information using the method implemented in step S105 and comparing the acquired result. Once the digest including the specified license plate information has been identified, the geographical location in which the license plate information was detected is identified, and a search command including the license plate information is transmitted to the vehicles 20 traveling in the vicinity of the identified geographical location.

Figure 8:
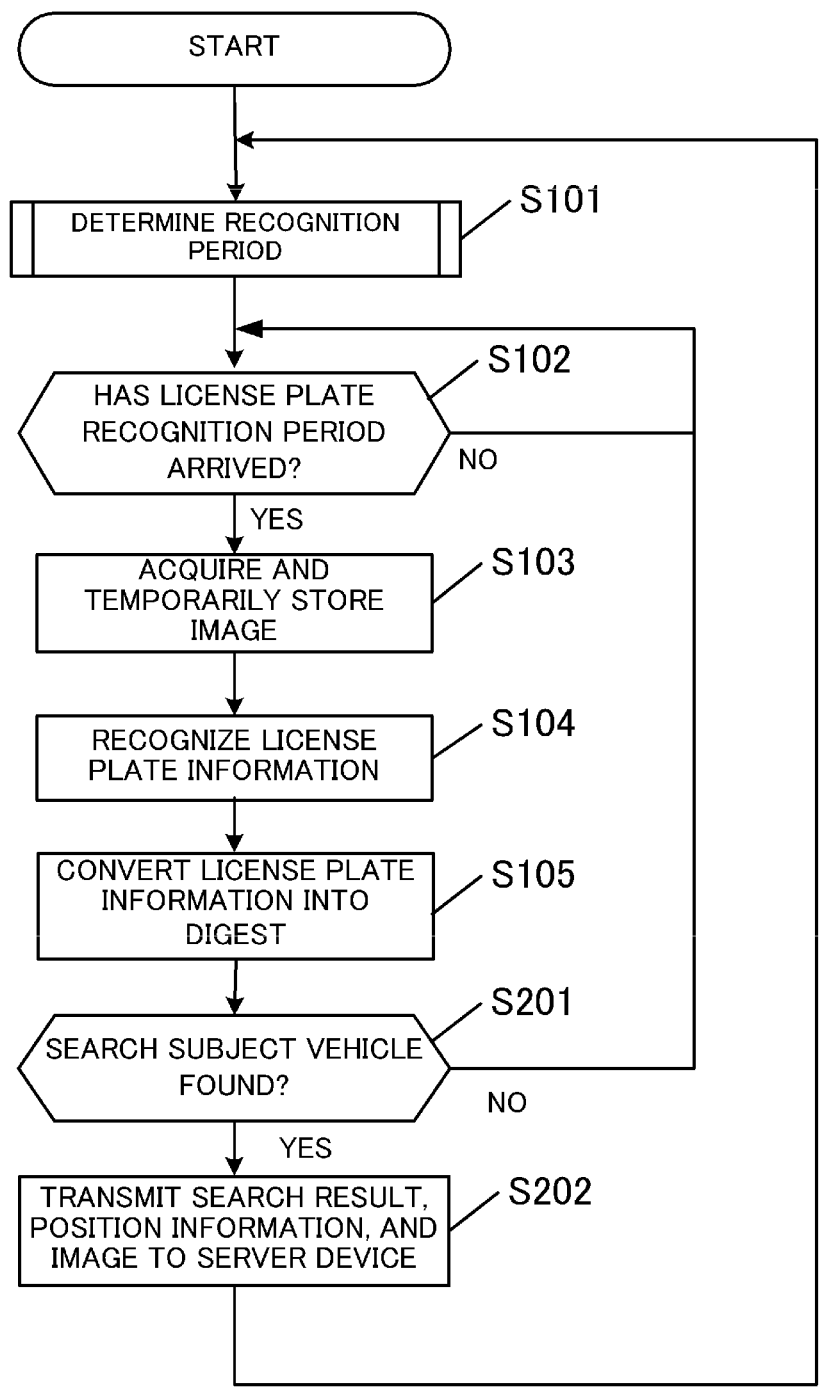
FIG. 8 is a flowchart showing processing executed by the in-vehicle device 30 during a search phase.

FIG. 8 is a flowchart showing the processing (the search phase) executed by the in-vehicle device 30 installed in the vehicle 20 after receiving the search command. The search phase is similar to the gathering phase in that license plate information recognition is implemented periodically, but differs therefrom in that when a match with the license plate information included in the search command is detected, the server device 10 is notified thereof. Steps indicated by dotted lines are identical to the gathering phase, and therefore detailed description thereof has been omitted.

When the search subject vehicle is found during the search phase (step S201-Yes), a notification indicating that the search subject vehicle has been found, the position information of the vehicle 20, and the image acquired by the in-vehicle camera are transmitted to the server device 10 (step S202).

As a result, the system manager can ascertain the current position of the search subject vehicle and the situation on the periphery thereof.

According to the first embodiment, as described above, in a system for searching for a vehicle on the basis of license plate information read by an in-vehicle device, the license plate information can be recognized in an appropriate period. More specifically, when the time in which the license plate of another vehicle stays within the field of view of the camera is shorter, the recognition period is set to be shorter, leading to an improvement in the precision with which the license plate is recognized in comparison with a case where the recognition period is fixed. Further, in cases where the license plate information does not have to be recognized at a high frame rate, the recognition period is set to be long, with the result that available resources can be used for other processing.

Second Embodiment

In the first embodiment, a value relating to the time in which the license plate of the other vehicle stays within the field of view of the in-vehicle camera is acquired using images acquired continuously. In a second embodiment, on the other hand, the time in which the license plate of another vehicle stays within the field of view of the in-vehicle camera is estimated on the basis of the road environment in which the vehicle 20 is traveling.

For example, as described above with reference to FIGS. 2A to 2C, the time required for another vehicle to pass through the field of view of the in-vehicle camera varies according to the road environment in which the vehicle 20 is traveling. In the second embodiment, therefore, the recognition period is set on the basis of a result of a comparison between the position information of the vehicle 20 and information relating to the road environment on the periphery of the vehicle 20.

Figure 9:
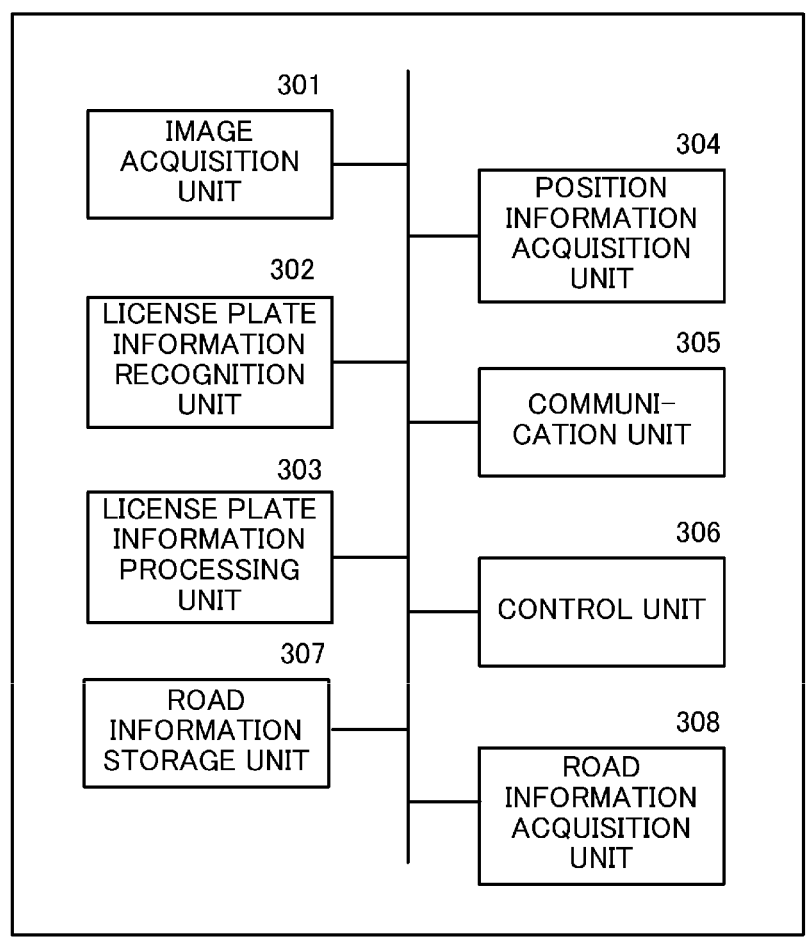
FIG. 9 is a view showing a system configuration of the in-vehicle device 30 according to a second embodiment.

FIG. 9 is a view showing a system configuration of the in-vehicle device 30 according to the second embodiment. Elements that are identical to the first embodiment are indicated by dotted lines, and description thereof has been omitted.

A road information storage unit 307 is a database storing information (referred to hereafter as road environment information) relating to the road environment in which the vehicle 20 is traveling. Examples of the road environment information include the existence of a sidewalk, the road width, the number of lanes, the volume of traffic, whether or not the road is one-way, and so on, although the road information storage unit 307 may store information other than these examples. In the second embodiment, the road environment information is provided for each of a plurality of zones (road segments) obtained by dividing the road into predetermined lengths. Further, the road environment information is stored in association with information indicating the geographical position of each road segment.

A road information acquisition unit 308 serves as a unit for acquiring the road environment information on the periphery of the vehicle 20 on the basis of the position information acquired by the position information acquisition unit 304 and the information stored in the road information storage unit 307. In the second embodiment, the control unit 306 sets the recognition period on the basis of the road environment information acquired by the road information acquisition unit 308.

Figure 10:
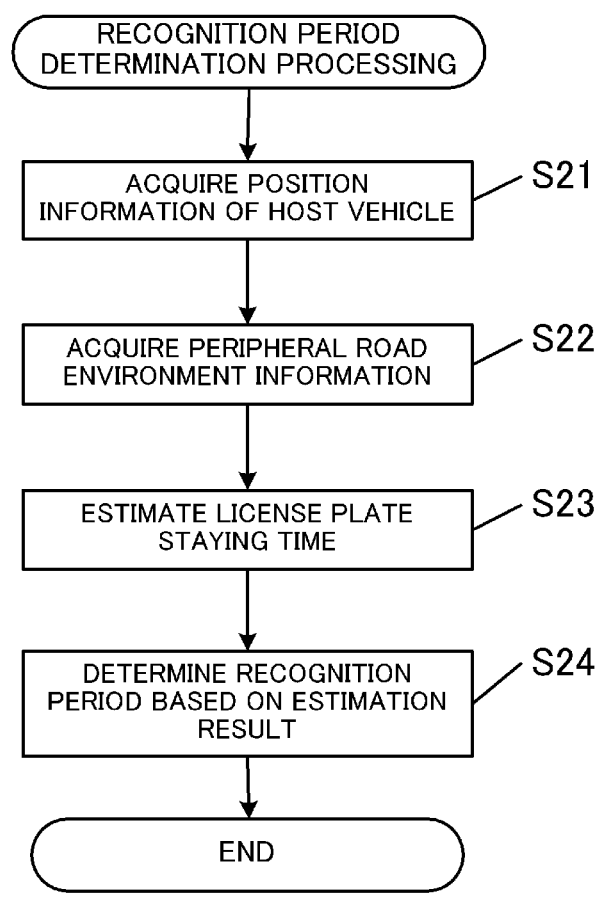
FIG. 10 is a flowchart showing processing executed by the in-vehicle device 30 in step S101 according to the second embodiment.

In the second embodiment, the processing executed in step S101 differs from the first embodiment. FIG. 10 is a flowchart showing the processing executed in step S101 in the second embodiment.

First, in step S21, the position information of the vehicle 20 is acquired via the position information acquisition unit 304. The position information may identify only the road along which the vehicle 20 is traveling or may also specify the travel direction and the travel lane. The segments set on the road may also be specified.

Next, in step S22, the database stored in the road information storage unit 307 is searched on the basis of the acquired position information to acquire the corresponding road environment information. At this time, the search may be refined using the travel direction, the travel lane, the segment, and so on.

Next, in step S23, the staying time of the license plate of another vehicle is estimated on the basis of the acquired road environment information.

A specific example will now be described.

In this embodiment, three examples, namely (1) an example in which information relating to the road width is used, (2) an example in which information relating to the existence of opposing lanes is used, and (3) an example in which information relating to a line of vehicles is used, will be used as examples of the road environment information.

(1) Example in which Information Relating to the Road Width is Used

As described above with reference to FIGS. 2A to 2C, the staying time of another vehicle within the field of view of the in-vehicle camera varies according to the width of the road on which the vehicle 20 is traveling. Therefore, information relating to the road width can be used effectively.

For example, the following information is acquired as the road environment information. The following example corresponds to the case shown in FIG. 2B.

median strip: none
number of travel lanes: 2
travel lane: second lane
number of opposing lanes: 2
lane width: 3 meters In this case, it is evident that the maximum distance from the travel lane to an opposing lane is 6 meters. Therefore, by referring to the information relating to the field of view (the dotted lines in FIGS. 2A to 2C) of the in-vehicle camera, it is possible to estimate the staying time of a license plate passing through the field of view.

Note that the speed of the host vehicle may also be used to estimate the staying time. The reason for this is that the staying time of a license plate varies greatly according to the relative speed. Similarly, when it is possible to acquire the speed of the opposing-side vehicle, this information may also be used.

For example, in a case where an oncoming vehicle is traveling 3 meters apart from the side of the host vehicle, the viewing angle of the in-vehicle camera is 120 degrees, the effective distance is 10 meters, and the relative speed is 60 km per hour, recognition must be performed at no less than 2.1 frames per second. When the relative speed is 120 km per hour, the frame rate becomes 4.3 frames per second.

Further, in a case where an oncoming vehicle is traveling 6 meters to the side of the host vehicle, the viewing angle of the in-vehicle camera is 120 degrees, the effective distance is 10 meters, and the relative speed is 60 km per hour, recognition must be performed at no less than 3.7 frames per second. When the relative speed is 120 km per hour, the frame rate becomes 7.4 frames per second.

Note that the speed of the host vehicle may be acquired from a communication bus such as a CAN, a vehicle speed sensor, or the like, or determined on the basis of GPS data. Further, the speed of the opposing-side vehicle may be acquired by vehicle-to-vehicle communication (Basic Safety Message or the like), for example, or estimated on the basis of information acquired from a radar, a LIDAR, a distance image sensor, or the like, or from an image analysis result.

Moreover, when it is possible to acquire information relating to the speed limit on the relevant road, this information may also be used. For example, when traveling on a road having a speed limit of 60 km per hour, an estimation may be made on the assumption that the vehicles are traveling at 60 km per hour.

(2) Example in which Information Relating to the Existence of Opposing Lanes is Used When there are no opposing lanes, there is no need to recognize the license plates of oncoming vehicles approaching at high speeds. Therefore, information relating to the existence of opposing lanes can be used effectively.

For example, when it is recognized from the road environment information that "the road on which the vehicle is traveling is a one-way road", this means that only the license plate of the preceding vehicle is visible, and therefore the staying time is estimated to be long. This example corresponds to the case shown in FIG. 2C. Note that this example applies similarly to a case in which there is a median strip through which the opposing lanes cannot be seen.

(3) Example in which Information Relating to a Line of Vehicles is Used

When the vehicle 20 is positioned in the middle of a line of vehicles, it becomes difficult to see through the line of vehicles to the opposing lanes. In this case, therefore, it is assumed that the opposing lanes cannot be seen. It may be determined that the vehicle 20 is positioned in the middle of a line of vehicles when the following condition, for example, is satisfied.

Condition 1

The vehicle 20 is stationary in a position at least a predetermined distance (at least 3 meters, for example) from the stopping position of an intersection.

Conversely, it may be determined that the vehicle 20 is positioned at the front of a line of vehicles when the following condition, for example, is satisfied.

Condition 2

The vehicle 20 is stationary in a position less than a predetermined distance (less than 3 meters, for example) from the stopping position of an intersection.

A case in which the opposing lanes are assumed to be invisible is handled in the same manner as (2), described above.

Next, in step S24, the recognition period (the frame rate) is determined on the basis of the estimated license plate staying time. For example, the recognition period is set such that the license plate information can be recognized at least once within the time period during which the other vehicle stays within the field of view of the in-vehicle camera.

According to the second embodiment, as described above, the license plate recognition period can be set at an appropriate value on the basis of road environment information.

Note that in the description of this embodiment, road environment information, or in other words information relating to features of the travel road, was used, but during travel in an area where it is not necessary for the vehicle 20 to perform license plate recognition at a high frame rate, the frame rate may be fixed. For example, when it is determined from the result of a comparison between map information and position information that the vehicle 20 is in a parking lot, the frame rate may be reduced.

Further, in this embodiment, a database storing the road environment information was used, but the database may be provided on the exterior of the in-vehicle device 30.

Furthermore, the road environment information may be acquired by directly sensing the periphery of the vehicle 20. For example, data acquired by a sensor such as a radar or a LIDAR may be used. The sensing subject may be the road width, the number of lanes, or a vehicle-to-vehicle distance to the preceding vehicle. When the vehicle-to-vehicle distance is smaller than a threshold, for example, it may be determined that the field of view of the in-vehicle camera is blocked by the preceding vehicle. Alternatively, road environment information transmitted from a roadside device may be received and used.

Moreover, the road environment information may be generated by analyzing the image acquired by the image acquisition unit 301. For example, on the basis of an image analysis result, the vehicle 20 may be determined to have stopped immediately in front of a stop line (in other words, to be positioned at the front of a line of vehicles).

Modified Examples

The above embodiments are merely examples, and the present disclosure may be modified appropriately within a scope that does not depart from the spirit thereof.

For example, when the load of the in-vehicle device 30 is too large for the license plate information recognition processing to be executed at the calculated recognition period, the server device 10 may be tasked with executing a part of the processing. For example, when the processing volume per unit time exceeds a prescribed volume, images corresponding to the excess may be transmitted to the server device 10, and the server device 10 may be tasked with executing the license plate information recognition processing.

Further, in the description of the embodiments, resource allocation is performed by adjusting the recognition period, but resource allocation may be performed by another method. For example, resource allocation may be performed by adjusting the recognition precision or the image resolution.

Furthermore, in the second embodiment, information relating to the road environment is used, but the recognition period may be set using only a sensing result acquired in relation to the other vehicle. For example, relative speeds of the host vehicle and the other vehicle may be calculated for each vehicle using the method described above. According to this aspect, the time in which the license plate stays within the field of view of the in-vehicle camera can be calculated for each vehicle, and on the basis thereof, the recognition period can be set appropriately.

The processing and means described in the present disclosure may be combined freely and implemented thus, providing that no technical contradictions arise as a result.

Further, processing described as being executed by a single device may be apportioned to and executed by a plurality of devices. Alternatively, processing described as being executed by different devices may be executed by a single device. In a computer system, the hardware configurations (server configurations) used to realize respective functions may be modified in a flexible manner.

The present disclosure can be realized by supplying a computer program in which the functions described in the above embodiments are packaged to a computer and having one or more processors provided in the computer read and execute the program. The computer program may be provided to the computer using a non-temporary computer-readable storage medium that can be connected to a system bus of the computer, or may be provided to the computer over a network. The non-temporary computer-readable storage medium includes any type of medium suitable for storing electronic commands, for example a type of disk such as a magnetic disk (a floppy (registered trademark) disk, a hard disk drive (HDD), and so on) or an optical disk (a CD-ROM, a DVD disk or Blu-ray disk, and so on), a read-only memory (ROM), a random access memory (RAM), an EPROM, an EEPROM, a magnetic card, a flash memory, or an optical card.

What is claimed is:

1. An in-vehicle device comprising:
   an image recognizer configured to acquire an image using a camera for photographing the exterior of a vehicle and execute processing for recognizing license plate information included in the image at intervals of a predetermined period; and
   a period determiner configured to determine the period to perform the recognition processing on the basis of a length of time in which a license plate of another vehicle stays within a field of view of the camera, wherein
   the period determiner shortens the period when the time in which the license plate of the other vehicle stays within the field of view of the camera is shorter.

2. The in-vehicle device according to claim 1, wherein the period determiner acquires a value relating to the time in which the license plate of the other vehicle stays within the field of view of the camera by analyzing a plurality of images acquired per unit time, and determines the period on the basis of the acquired value.

3. The in-vehicle device according to claim 1, further comprising
   an information acquirer configured to acquire environment information, which is information relating to a road environment on the periphery of the vehicle,
   wherein the period determiner estimates the time in which the license plate of the other vehicle stays within the field of view of the camera on the basis of the environment information.

4. The in-vehicle device according to claim 3, wherein the environment information is acquired on the basis of a result of comparison between a current position of the vehicle and a road database.

5. The in-vehicle device according to claim 3, wherein the environment information is acquired from a roadside device.

6. The in-vehicle device according to claim 3, wherein the environment information is at least one of information relating to a number of lanes, information relating to a road width, and information relating to a relative position relative to an intersection.

7. A control method for causing an in-vehicle device installed in a vehicle to execute:
   an image recognition step for acquiring an image using a camera for photographing the exterior of the vehicle and executing processing for recognizing license plate information included in the image at intervals of a predetermined period; and
   a period determination step for determining the period to perform the recognition processing on the basis of a length of time in which a license plate of another vehicle stays within a field of view of the camera, wherein
   the period determination step shortens the period when the time in which the license plate of the other vehicle stays within the field of view of the camera is shorter.

* * * * *